United States Patent
Schellenbach

Patent Number: 5,230,856
Date of Patent: Jul. 27, 1993

[54] METHOD FOR DEMOLDING A SAFETY-SEAL STRIP OF A CLOSURE CAP

[76] Inventor: Frank Schellenbach, Lindenstr. 17, 7268 Gechingen, Fed. Rep. of Germany

[21] Appl. No.: 703,385

[22] Filed: May 21, 1991

[30] Foreign Application Priority Data

May 21, 1990 [DE] Fed. Rep. of Germany ....... 4016350

[51] Int. Cl.$^5$ .......................... B29C 45/40; B29C 1/00
[52] U.S. Cl. ..................... 264/328.1; 249/59; 264/318; 264/328.11; 264/334; 425/438; 425/556; 425/575; 425/DIG. 58
[58] Field of Search ........ 264/334, 318, 328.1, 264/328.11; 425/575, 438, 577, DIG. 58, 556; 249/59

[56] References Cited

U.S. PATENT DOCUMENTS

| | | | |
|---|---|---|---|
| 3,344,942 | 10/1967 | Hedgewick | 264/318 X |
| 3,584,111 | 6/1971 | Allison | 264/318 |
| 4,496,302 | 1/1985 | Brown | 264/318 X |
| 4,552,328 | 11/1985 | Dutt et al. | 249/59 X |
| 4,570,897 | 2/1986 | Von Holdt | 425/DIG. 58 X |
| 4,648,834 | 3/1987 | Von Holdt | 264/334 X |
| 4,741,447 | 5/1988 | John | 215/344 X |
| 4,751,036 | 6/1988 | Barriac | 264/318 |
| 4,806,301 | 2/1989 | Conti | 264/334 |
| 4,881,892 | 11/1989 | Webster et al. | 425/DIG. 58 X |
| 4,933,133 | 6/1990 | Brown et al. | 264/318 X |
| 4,983,346 | 1/1991 | Curliss et al. | 264/318 X |
| 5,053,182 | 10/1991 | Hedgewick | 264/318 |

FOREIGN PATENT DOCUMENTS

| | | | |
|---|---|---|---|
| 2542045 | 3/1977 | Fed. Rep. of Germany | 264/318 |
| 1-104832 | 5/1986 | Japan | 264/318 |
| 86/01179 | 2/1986 | PCT Int'l Appl. | 264/318 |
| 2022063 | 12/1979 | United Kingdom | 264/318 |

Primary Examiner—Karen Aftergut
Attorney, Agent, or Firm—Kenyon & Kenyon

[57] ABSTRACT

In the injection molding of closure caps, the problem of demolding the safety-seal strip, which is suspended at an intended break line and is necessarily provided with undercuts, is encountered. Here a clearance must first be created at the lower outer surface of the safety-seal strip, and the safety-seal strip must then be stripped from the mold core together with the closure cap. As a practical method step, the invention proposes to bring about the release of the lower portion of the outer surface of the safety-seal strip by lowering a mold ring which is displaceable relative to the stripper plate.

9 Claims, 4 Drawing Sheets

METHOD FOR DEMOLDING A SAFETY-SEAL STRIP OF A CLOSURE CAP

BACKGROUND OF THE INVENTION

The present invention relates to a method for demolding a safety-seal strip of a closure cap. The invention further relates to an injection-molding apparatus designed to permit the demolding method to be used as part of a production cycle.

A method for molding a safety-seal strip of a closure cap is known from French patent 2,426,617. Reference is made to this publication for an explanation of the technical background of the invention.

Plastic closure caps suitable for closing beverage bottles or similar containers have found wide use. Such closure caps often comprise an upper disk onto whose underside a seal ring is molded, a cylindrical side wall which on its inner surface is provided with a screw thread, and a safety-seal strip suspended from the lower rim of the closure cap by relatively weak webs distributed over the periphery. When such a closure cap is screwed or pressed onto the neck of a beverage bottle, thus closing the bottle securely, the safety-seal strip serves to indicate that the closure is intact. For this purpose, a bead on the inner circumference of the safety-seal strip engages a corresponding groove in the neck of the bottle. When the bottle is opened for the first time, the safety-seal strip is completely or partly torn off the closure cap by the unscrewing motion.

The manufacture of a closure cap with a safety-seal strip suspended therefrom is not simple since the injection mold comprises not only several undercuts but also an intended break line for the subsequent use. The basic problem in the manufacture of such safety-seal strips is that they must not tear off during the manufacturing process, whereas later, in actual use, they should not offer appreciable resistance when the closure cap is unscrewed from the bottle. Since the shape of the mold core of the injection-molding apparatus employed in the manufacture is quite similar to that of the bottle neck used later, provision must be incorporated in the injection-molding apparatus for freeing the safety-seal strip intact. Such provision involves in particular the demolding phase, in which a finished injection-molded part is removed from the mold. Within that phase, the steps during which the safety-seal strip is stripped from the core are particularly critical.

The injection-molding apparatus disclosed in French patent 2,426,617 and the respective sequence of operations in the manufacture offer the following solution of the basic problem outlined: The closed injection mold essentially consists of an outer cavity forming member which determines the outer shape of the closure cap, and of a core which establishes the inner shape of the closure cap. The outer mold cavity overall includes, in addition to the upper cover, an injection crown which injects plastic material at the level of the webs (in other words, at the level of the parting line between closure cap and safety-seal strip), and a mold ring which molds the lower outer surface of the safety-seal strip. On completion of the injection-molding operation, the upper cover plate can be taken off and the injection crown can be used as a stripper plate. In this prior-art solution, the mold ring, located under the stripper plate, is stationary. During the stripping operation, a clearance is thus created at the lower outer surface of the safety-seal strip between the stationary mold ring and the upwardly carried crown, and in that clearance the safety-seal strip is able to distend outwardly.

In the prior-art solution, the mold core comprises an axially displaceable cylinder which molds both the screw thread on the inner surface of the closure cap and an undulating circumferential bead on the inner surface of the safety-seal strip. This movable internal mold is carried along upwardly during the demolding phase until it strikes a stop. At that instant, both the closure cap and the safety-seal strip can be distended into the externally created clearances; only in the area between the webs does the crown, as the stripper plate, engage the underside of the closure cap. At the same time, the crown engages the underside of a small undercut molded into the safety-seal strip in the upper portion of its outer surface. It is on these two peripheral lines that the forces which strip the whole closure cap from the mold core, now locked in position, are acting simultaneously. The connecting webs therefore are not subjected to any axial stresses. After stripping, the finished part is ejected, for example, by compressed air. Further details on the injection molding of closure caps provided with safety-seal strips in general and on the prior-art demolding of a finished injection-molded part in particular will be found in French patent 2,426,617.

In the prior-art method, it has proved onerous and mechanically complicated that in demolding a movable mold cylinder which is guided between two stationary cylinders, and which defines the inner surface of the closure cap and the safety-seal strip with all undercuts, has to participate in part of the stripping motion before it is locked in position to permit the molded part to be definitely removed.

SUMMARY OF THE INVENTION

The present invention provides for a better sequence of operations in demolding in conjunction with a demolding tool of improved design. It seeks to permit the partial release of the outer surface of the safety-seal strip without a movable part associated with the mold core having to be carried along in the stripping direction. In the present invention release of the lower portion of the outer surface of the safety-seal strip is accomplished by lowering a mold ring which is movably set into the stripper plate. The present invention additionally includes a demolding apparatus suitable for carrying out this method. The use of the novel method in place of the known sequence of operations in demolding offers a substantial advantage: The external release of the safety-seal strip can be combined time-wise and mechanically with the demolding of a sealing lip in the interior of the closure cap, in other words, with a lowering operation which has to be performed anyway. The upwardly directed stripping operation is thus shortened since the mold core is stationary and need not be carried along.

The present invention additionally includes further alternative embodiments. In particular, two exemplary embodiments which differ with respect to the peripheral line on which the force for the stripping motion of the safety-seal strip is acting are to be distinguished. In the first of these embodiments, the mold ring acts in addition as a stripping ring in that it engages the underside of the free end of the safety-seal strip. For this purpose, the free end is outwardly flared as a funnel-like extension. This configuration has the further advantage that after the beverage bottle has been filled the placing of the closure cap is facilitated since the bottle neck is centered in the closure cap through the funneling effect of the safety-seal strip.

In the other exemplary embodiment, no annular recess is provided in the lowerable mold ring. Instead, the stripper plate which forces the closure cap off the mold core also effects the stripping of the safety-seal strip.

The stationary mold core need not shape the subjacent bead over the entire 360-degree circumference, as it is in the demolding apparatus of French patent 2,426,617. A plurality of individual sectors in each of which an intended break line is associated with a bead will suffice. As a limiting case, a single bead extending over less than half of the periphery. Every discontinuity in the bead will promote the stripping of the safety-seal strip from the mold core. While demolding is thus facilitated, the safety-sealing function is preserved in the first-time unscrewing of the closure cap. For the safety-sealing function, the webs traverse sequentially a point of maximum tension.

BRIEF DESCRIPTION OF THE DRAWINGS

The invention and the two exemplary embodiments will now be described in detail with reference to FIGS. 1 to 4, wherein.

DETAILED DESCRIPTION

Figure 1:
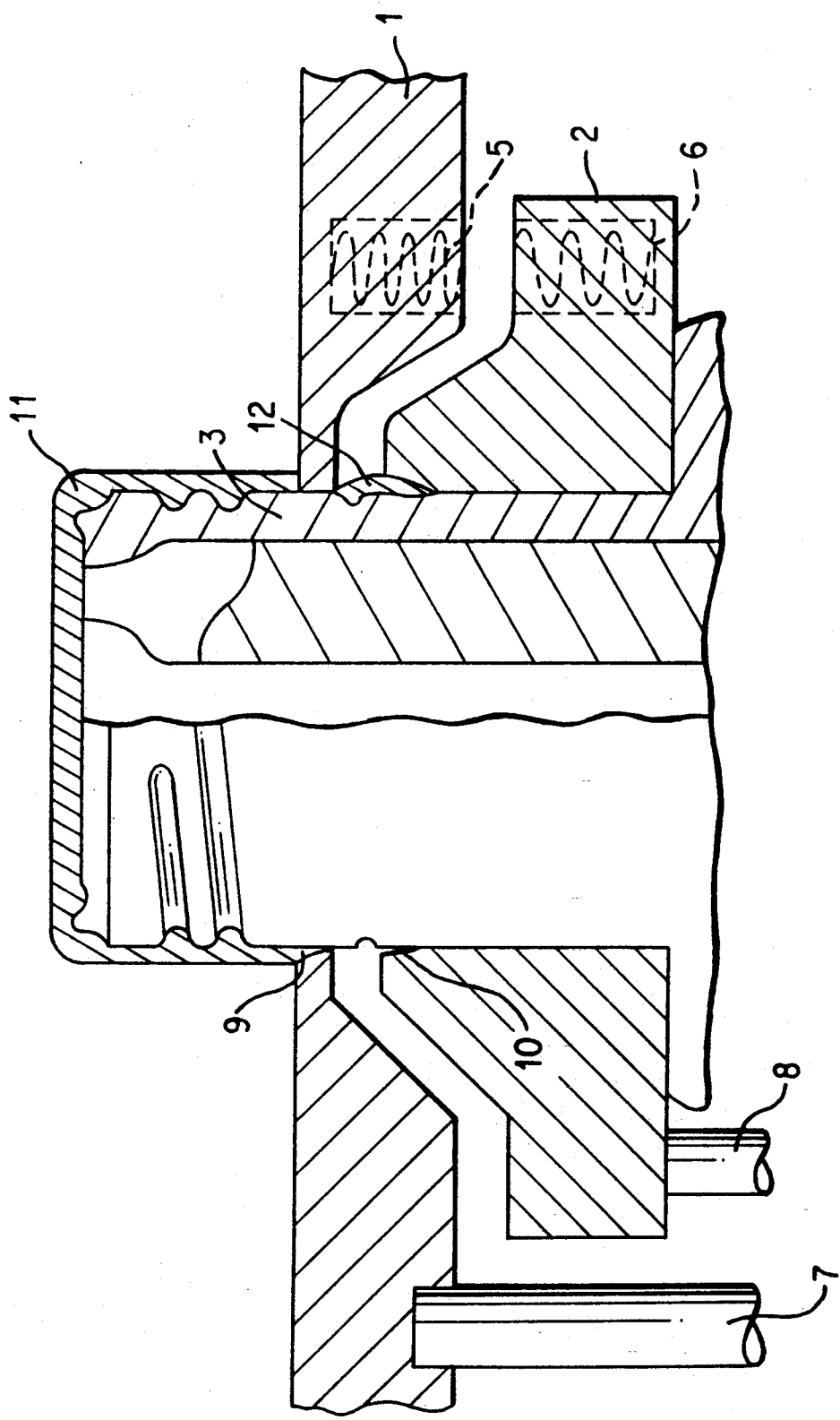
FIG. 1 illustrates the parts of an inventive injection-molding apparatus which are of importance to the demolding of a safety-seal strip.

In FIG. 1, the stripper plate 1, the mold ring 2 and the mold core 3 define the mold for the safety-seal strip 12. The mold core 3 defines also the inner shape of the closure cap 11. As shown, the outer mold cavity forming member, which determines the outer shape of the closure cap 11, has already been removed. The mold ring 2 is shown in the position into which it was lowered through the elastic force of the spring assembly 5 and 6 relative to the stripper plate 1. The safety-seal strip 12 was thus released in the lower portion of its outer surface. The lowering of the mold ring 2 is made possible by the draft 10. In FIG. 1, the safety-seal strip 12 is not shown on the left-hand side of the closure cap 11 in order to permit a better appreciation of the details of the open mold.

The stripper plate 1 is provided with injection points 9 and thus performs the function of an injection crown during the injection process. The stripper plate 1 and the mold ring 2 are accommodated in a common plate which comprises at the same time a plurality of the devices shown in FIG. 1. Several pressure bars 8 are provided for each device to raise the mold ring 2 against the force of the spring assembly 5 and 6, thus closing the injection mold for the safety-seal strip 12. The stripper bars 7 serve to raise and lower the stripper plate 1.

Figure 2:
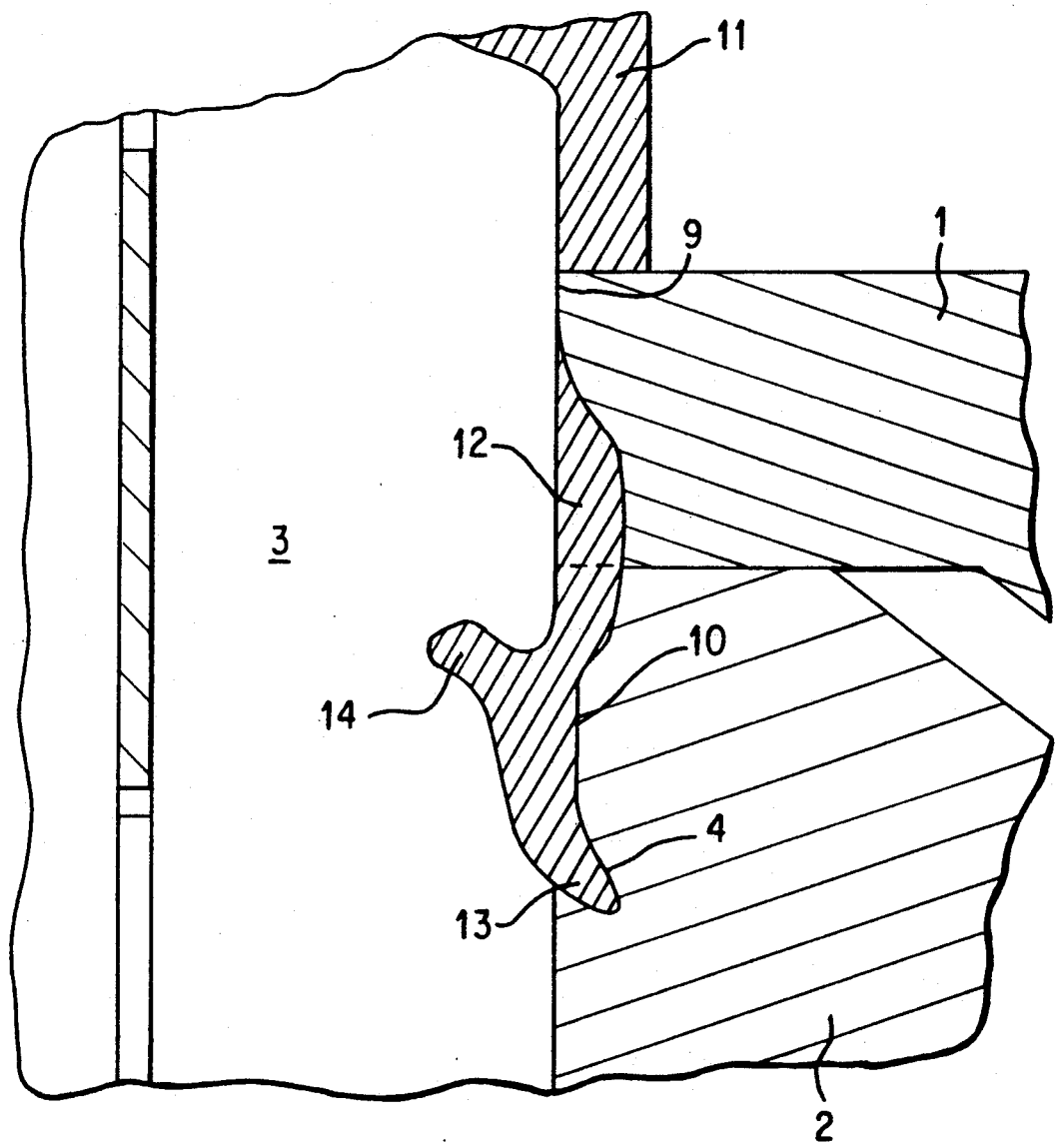
FIG. 2 is a greatly magnified fragment from the view of FIG. 1 which shows how the injection mold for the safety-seal strip can be opened and closed (first exemplary embodiment)

How the inventive demolding method is incorporated into the manufacturing process in the case of the preferred embodiment will now be explained with the aid of FIG. 2. By means of the stripper bars 7, the stripper plate 1 is moved into the position in which it acts as an injection crown. By means of the pressure bars 8, the mold ring 2 closes the injection mold off downwardly while an outer mold cavity forming member (not shown) is upended over the mold core 3 in order to upwardly close the injection mold for the actual closure cap 11. The spring assembly 5 and 6 is compressed as a result of the raising of the mold ring 2. The major portion of the closure cap 11 is injection-molded through central injection from above. The material injected is preferably polyethylene. At the injection points 9 of the injection crown 1, the remaining material for the lower portion of the closure cap 11 and the material for the safety-seal strip 12 are injected. In FIG. 2, the injection crown 1 is shown in section at a point where the safety-seal strip 12 is separated from the closure cap 11 by a clearance. In front and to the rear of it, webs (not shown) by which the safety-seal strip 12 is suspended from the closure cap 11 should be imagined. The clearances and the webs form the intended break line for the future use. The intended break line may also be formed by a plurality of intended break points and stronger intermediate webs distributed over the 360-degree circumference. The material which is injected at the points 9 flows all the way down into an annular recess 4 machined into the mold ring 2. Moreover, by means of the notch in the mold core 3 shown in FIG. 2, there is further molded the inner bead 14 which comes to be seated under the bottle neck after a beverage bottle is closed. In this exemplary embodiment, no demolding aid for the safety-seal strip 12 is incorporated.

On completion of the injection molding, the mold opens. The outer mold cavity forming member (not shown) is taken off by lifting in an axial direction of the mold core. The pressure bars 8 are released and the spring assembly 5 and 6 forces the mold ring 2 to be lowered downward in an axial direction of the mold core. The slight draft 10 of the mold ring 2 causes increasing clearances to be formed in the course of the downward movement. The material of which the safety-seal strip 12 is made is flexible, and the recess 4 extends radially slightly beyond the upper edge of the mold ring 2. The webs (not shown) and the bottom surface of the bead 14 together produce the relatively minor force required for pulling the nose 13 out of the recess 4. Practical tests have shown that the shaping according to FIG. 2 can be adapted to the elastic properties of the polyethylene material used that the nose 13 is not sheared off or otherwise damaged as the mold ring 2 is lowered.

Figure 4:
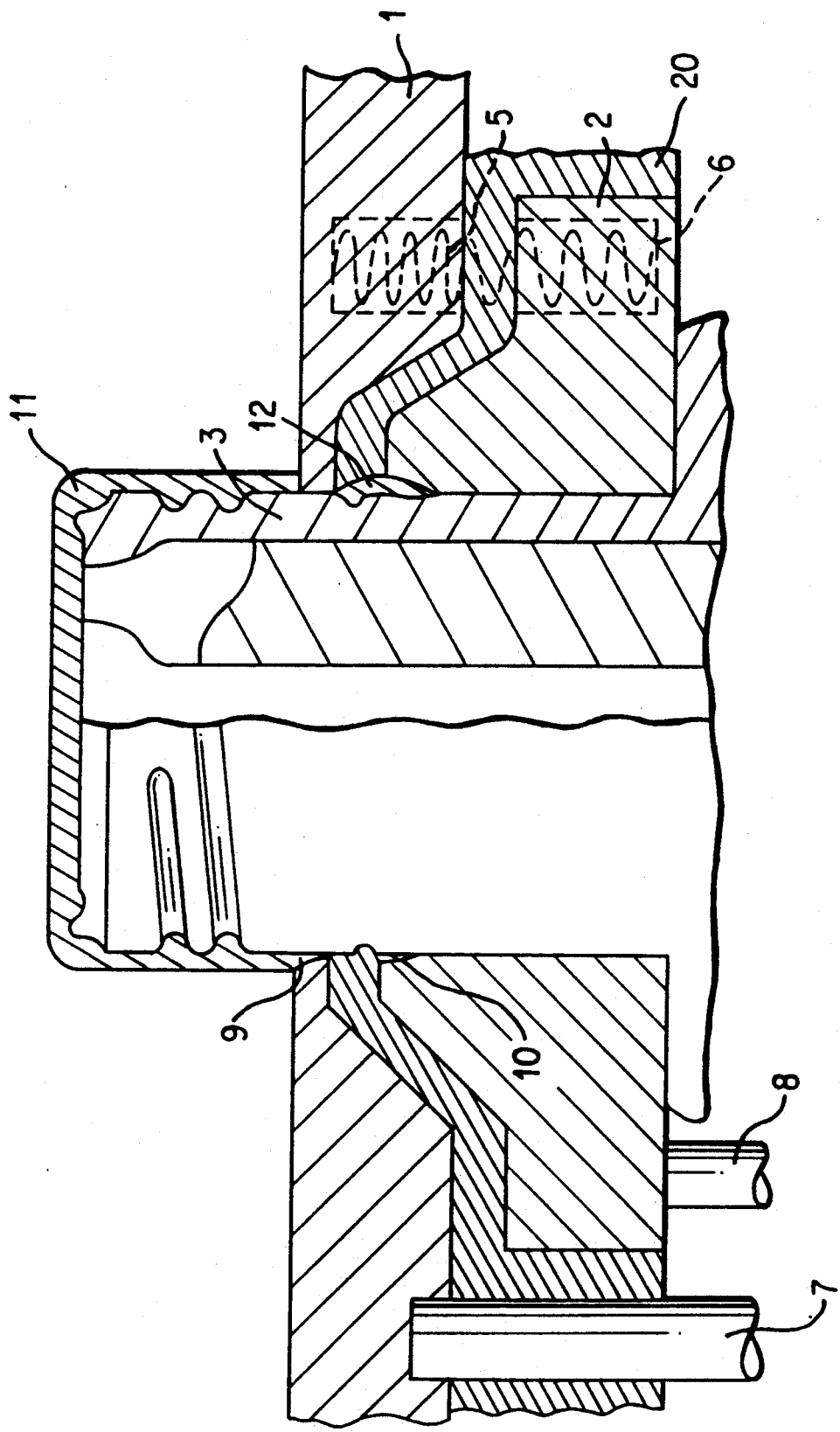
FIG. 4 illustrates a large plate of the injection-molding apparatus.

After the mold ring 2 has been opened as far as the lower edge of the nose 13, the latter leaps onto the upper edge of the mold ring 2 and turns slightly outward. The large plate 20 (see FIG. 4) in which both the stripper plate 1 and the mold ring 2 are accommodated then moves upward with the aid of the stripper bars 7. During this movement, the stripper plate 1 raises the closure cap 11 since it engages its lower edge between the webs. At the same time, the mold ring 2 presses against the outwardly turned rim of the safety-seal strip 13 and strips the bead 14 upward over the mold core 3. The webs (not shown) thus are not subjected to appreciable tensile stresses. In view of the opening action which the upward movement of the mold ring 2 exerts on the funnel-like rim 13 of the safety-seal strip 12, a V notch may even be formed in the top surface of the bead 14. The stripping motion will nevertheless be feasible. Such shaping of the bead 14 has heretofore been possible only when the safety-seal strip 12 was produced separately from the closure cap 11 and demolded by a reverse, downward stripping motion.

As soon as the closure cap 11, including the safety-seal strip 12, has been stripped from the mold core 3, it can be completely ejected upwardly. The processing cycle is then repeated, beginning with the closing of the mold.

Figure 3:
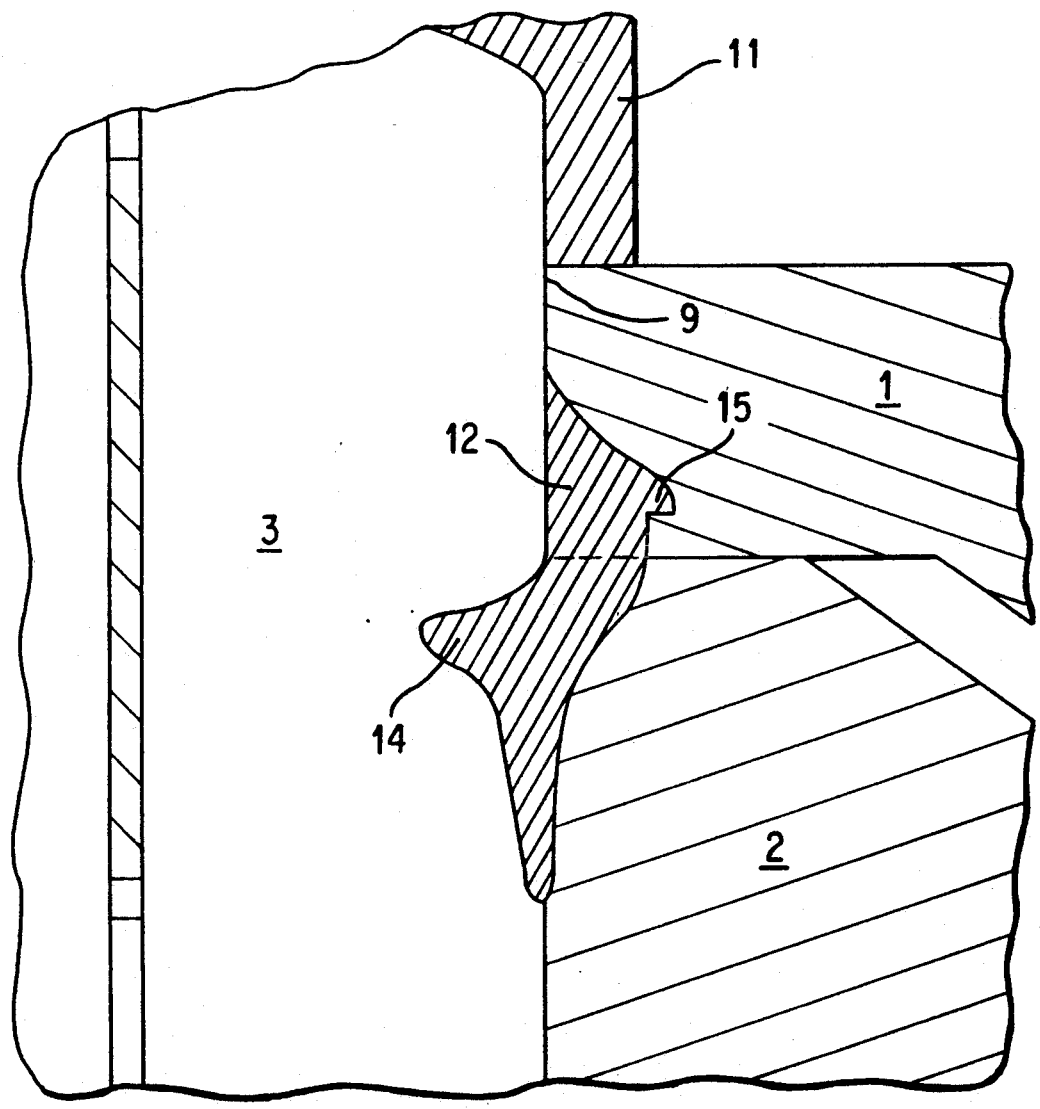
FIG. 3 shows the same fragment from the sectional view of FIG. 1 for the second exemplary embodiment.

The second exemplary embodiment, shown in FIG. 3, involves in place of the nose 13 at the lower rim of the safety-seal strip 12 an undercut 15 in the area of the stripper plate 1. During its upward demolding movement, the stripper plate 1 engages the underside of the safety-seal strip 12 at the undercut 15. Apart from this, the lower portion of the safety-seal strip 12 is released here, too, through the lowering of the mold ring 2 before the stripping movement. Here, too, the cylindrical outer surface of the mold core 3 is stationary throughout the demolding operation so that the stripping movement of the plate 1 is effected immediately.

To conclude the specification, the characteristics of the invention will now be summarized in the form of the following clauses:

1. A method for demolding a safety-seal strip of a closure cap, said demolding method being preceded by the production by injection molding of the closure cap, including the safety-seal strip suspended therefrom, and by the opening of the injection mold by lifting an outer mold cavity forming member off a mold core, the safety-seal strip being stripped from the mold core together with the closure cap, which is engaged on its underside by a stripper plate, after the outer surface of the flexible safety-seal strip has been released in the area of an opposite bead on its inner surface, characterized in that the release of the lower portion of the outer surface of the safety-seal strip (12) is brought about by lowering a mold ring (2) which is movably set into the stripper plate (1).

2. A demolding method as defined in clause 1, characterized in that the mold ring (2) is lowered as far as the lower edge of the safety-seal strip (12).

3. A demolding method as defined in clause 2, characterized in that the lowering of the mold ring (2) is brought about through spring energy (5, 6).

4. A demolding method as defined in clause 2 or clause 3, characterized in that the free lower rim (nose 13) of the safety-seal strip (12) flares outwardly over the upper edge of the mold ring (2) after the latter has been lowered.

5. A demolding method as defined in clause 4, characterized in that the mold ring (2) strips the safety-seal strip (12) from the mold core (3) by moving upward together with the stripper plate (1) which strips the closure cap (11).

6. A demolding method as defined in clauses 1 to 3, characterized in that the stripper plate (1) carries along, in addition to the lower rim of the closure cap (11), also the safety-seal strip (12) at an undercut (15), thus stripping it from the mold core (3).

7. A demolding method as defined in one of the preceding clauses, characterized in that polyethylene is the material used in injection molding.

8. A demolding method as defined in one of the preceding clauses, characterized in that the mold ring (2) is forced against the stripper plate (1) as part of the closing of the injection mold which occurs prior to injection.

9. A demolding method as defined in one of the preceding clauses, characterized in that material is injected for the safety-seal strip (12) and for a portion of the closure cap (11) above webs whereby the safety-seal strip (12) is suspended from the closure cap (11).

10. An apparatus for demolding a safety-seal strip of a closure cap, characterized by a stripper plate (1) which is also designed as an injection crown (9) for injection of the material for a safety-seal strip (12) and which molds the top outer surface thereof; a mold ring (2) which is axially displaceable relative to the stripper plate (1) and which molds the bottom outer surface (10) of the safety-seal strip (12); and a stationary mold core (3) which molds the inner surface of the safety-seal strip (12), including the undercut bead (14).

11. A demolding apparatus as defined in clause 10, characterized in that a plurality of stripping plates (1) and as many associated mold rings (2) are arranged in a common plate.

12. A demolding apparatus as defined in clause 11, characterized in that said common plate executes the stripping motion by being raised by stripper bars (7).

13. A demolding apparatus as defined in clauses 10 to 1, characterized by a spring assembly (5, 6) which lowers the mold ring (2).

14. A demolding apparatus as defined in clause 13, characterized by pressure bars (8) which close the injection mold for the safety-seal strip (12) against the force of the spring assembly (5, 6).

15. A demolding apparatus as defined in clauses 10 to 14, characterized in that the lowerable mold ring (2) comprises a draft (10).

16. A demolding apparatus as defined in clauses 10 to 15, characterized by an annular recess (4) in the lowerable mold ring (2) in which a nose (13) is molded at the free end of the safety-seal strip (12).

17. A demolding apparatus as defined in clauses 10 to 15, characterized by a shoulder in the stripper plate (1) which produces an undercut (15) in the upper portion of the safety-seal strip (12).

18. A deforming apparatus as defined in clauses 10 to 17, characterized in that the stationary mold core (3) shapes a bead (14) in whose top surface a V notch is formed. (FIG. 2.)

19. A demolding apparatus as defined in clauses 10 to 17, characterized in that the stationary mold core (3) shapes a bead (14) whose top surface is approximately level. (FIG. 3.)

20. A demolding apparatus as defined in clauses 10 to 19, characterized in that the stationary mold core (3) shapes the bead (14) only in sectors of the inner surface of the safety-seal strip.

21. A demolding apparatus as defined in clause 20, characterized by a bead (14) and an intended break point per sector of the inner circumference.

22. A demolding apparatus as defined in clause 20, characterized by a single bead (14) which occupies less than one-half of the inner circumference.

23. A safety-seal strip produced by injection molding which is suspended by severable webs from a closure cap and which comprises on its inner surface one or more circumferential beads which engage the underside of the neck of a bottle when the safety-seal strip is being used, characterized by a funnel-like extension (13) at the free end of the safety-seal strip (12) whose outside diameter is somewhat larger than the outside diameter of the safety-seal strip at the parting line of the injection mold (1, 2).

24. A safety-seal strip as defined in clause 23, characterized in that it is produced as a unit with the closure cap (11).

25. A safety-seal strip as defined in clause 23 or clause 24, characterized by a V notch formed in the top surface of one or more of the beads (14).

I claim:

1. A method for demolding a flexible safety-deal strip of a closure cap from an injection mold, the demolding method being preceded by production by injection molding of the closure cap, including the flexible safety-seal strip suspended therefrom, and by opening of the injection mold by separating an outer mold cavity forming means from a mold core, wherein:
   a mold ring, along with a stripper plate, forms a molding surface for an outer surface of the flexible safety-seal strip,
   the mold core forms a molding surface for a bead on an inner surface of the flexible safety-seal strip and for an inner surface of the closure cap,
   the mold ring is movably set against the stripper plate during the injection molding of the closure cap and the flexible safety-seal strip, and the mold ring is lowered from the stripper plate by forces applied by a spring to release the flexible safety-seal strip from the mold ring, and then
   the flexible safety-seal strip is stripped from the mold core together with the closure cap, which closure cap is engaged on its underside by the stripper plate, and
   the mold core remains stationary during the demolding method.

2. A demolding method as defined in claim 1, wherein the mold ring is lowered as far as a lower edge of the flexible safety-seal strip.

3. A demolding method as defined in claim 2, wherein a free lower rim of the flexible safety-seal strip flares outwardly over an upper edge of the mold ring after the mold ring has been lowered.

4. A demolding method as defined in claim 3, wherein the mold ring strips the flexible safety-seal strip from the mold core by moving upward together with the stripper plate which strips the closure cap.

5. A demolding method as defined in claim 1, wherein the stripper plate carries along, in addition to a lower rim of the closure cap, an undercut of the flexible safety-seal strip, thus stripping it from the mold core.

6. A demolding method as defined in claim 1, wherein a material used for the injection molding is polyethylene.

7. A demolding method as defined in claim 1, wherein the mold ring is forced against the stripper plate as part of closing of the injection mold which occurs prior to injection.

8. A demolding method as defined in claim 1, wherein material is injected for the flexible safety-seal strip and for a portion of the closure cap whereby the flexible safety-seal strip is suspended from the closure cap.

9. A demolding method as defined in claim 1, wherein the separating and lowering steps are performed in an axial direction of the mold core.

* * * * *